US009235830B1

(12) United States Patent
VanBlon et al.

(10) Patent No.: US 9,235,830 B1
(45) Date of Patent: Jan. 12, 2016

(54) ESTABLISHING A REMINDER FOR AN EVENT IN A CALENDAR

(71) Applicant: Lenovo (Singapore) Pte. Ltd., New Tech Park (SG)

(72) Inventors: Russell Speight VanBlon, Raleigh, NC (US); Nathan J. Peterson, Durham, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/463,395

(22) Filed: Aug. 19, 2014

(51) Int. Cl.
*G04G 13/02* (2006.01)
*G06Q 10/10* (2012.01)

(52) U.S. Cl.
CPC .............. *G06Q 10/109* (2013.01); *G04G 13/02* (2013.01); *G04G 13/026* (2013.01)

(58) Field of Classification Search
CPC ....... G04G 13/026; G04G 13/02; G05B 11/01
See application file for complete search history.

(56) References Cited

U.S. PATENT DOCUMENTS

| 7,400,229 | B2* | 7/2008 | Boss | G06Q 10/109 340/309.16 |
| 8,195,203 | B1* | 6/2012 | Tseng | H04M 1/72569 455/414.3 |
| 8,273,019 | B2* | 9/2012 | Crowley | G06F 19/3418 368/10 |
| 2006/0203620 | A1* | 9/2006 | Bedingfield, Sr. | G06Q 10/109 368/247 |
| 2009/0149166 | A1* | 6/2009 | Habib | H04M 3/432 455/414.3 |
| 2010/0085842 | A1* | 4/2010 | Lazaridis | G04G 13/026 368/73 |
| 2010/0091615 | A1* | 4/2010 | Scott | G04G 9/0076 368/21 |

OTHER PUBLICATIONS

Suzanne Marion Beaumont, Rod D. Waltermann, Grigori Zaitsev, "Representing in an Electronic Calendar Travel Time to and From an Event", file history of related U.S. Appl. No. 14/549,187.

* cited by examiner

*Primary Examiner* — Sean Kayes
(74) *Attorney, Agent, or Firm* — John L. Rogitz; John M. Rogitz

(57) ABSTRACT

In one aspect, a first device includes a processor and a memory accessible to the processor. The memory bears instructions executable by the processor to receive information pertaining to an event to occur at a first date and a first time, establish an entry at an electronic calendar for the event based on the first date and first time, determine a second date and a second time at which to provide a reminder for the event based at least in part on an event type to which the event pertains, and set the reminder to be provided at the second date and second time.

24 Claims, 8 Drawing Sheets

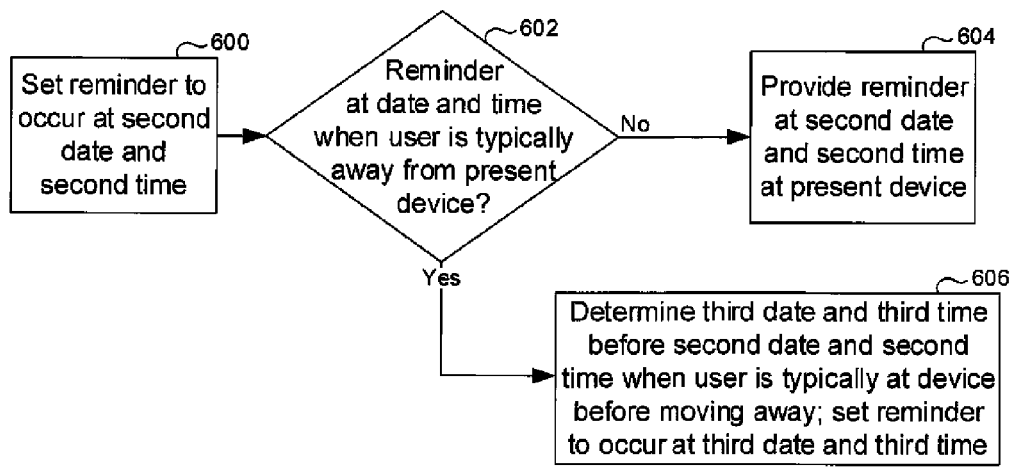

FIG. 6

| Word | Event type | Past user experience | Past event information | Activities before event | Activities at event |
|---|---|---|---|---|---|
| birthday 714 | birthday party | Purchased card; Purchased order item; Ate cake | $50 cap on presents; Spent $55 on amazon.com 5 days before | Purchase birthday present | Eat; Talk in group |
| boss 716 | work meeting | Ate at meeting; heart rate increase; prepared for 2 hours | 2.2 miles traveled to meeting from office | Prepare meeting outline | Eat; Discuss items on agenda |
| Dr. James 718 | medical appointment | Fasted 12 hours prior; Late by 10 minutes; Body temp increase | Completed electronic forms | Bloodwork; Fast 12 hours | Office visit; Provide vitals |

FIG. 7

| Profile | First reminder default time | First reminder content | Second reminder default time | Second reminder content |
|---|---|---|---|---|
| birthday party | 2 days before | Buy present | 2 hours before on device 2 | Do not eat until party |
| meeting | 1 day before | Prepare meeting outline; Takes 2 hours on average | 4 hours before | Take blood pressure medication; Do not eat if dinner meeting |
| medical appointment | 12 hours before | Arrive early to get bloodwork done | 1 hour before | Look at traffic report to find fastest route |

FIG. 8

Create Event  Submit

Title/Information: ☐

Date: ☐

Time: ☐

Reminder information: ☐

Reminder date: ☐

Reminder time: ☐

Event profile with which to associate event:
- birthday party
- medical appointment
- work meeting

FIG. 9

Create Event Profile — 1000

Profile Name: [birthday party] — 1002

First reminder default time: [2 days] 1004 [This device] 1006 [Device 2] 1008

First reminder content: [buy present] — 1010

Second reminder default time: [2 hours] 1012 [This device] 1014 [Device 2] 1016

Second reminder content: [Do not eat until party] — 1018

[Submit] — 1020

Event Created! — 1102

Create profile for events like this? — 1104

[Create Profile] — 1106

Create specific reminders for events of this type? — 1108

[Create reminders for events of this type] — 1110

ESTABLISHING A REMINDER FOR AN EVENT IN A CALENDAR

FIELD

The present application relates generally to establishing a reminder for an event in a calendar.

BACKGROUND

Electronic calendars are sometimes configured to provide a reminder regarding an event in the calendar prior to the actual event. However, these reminders typically occur at a set time regardless of the particular event, even though different reminders may be desired for different events. Furthermore, there may be instances where a user may wish to have a reminder provided at a specific and/or opportune time depending on the specific event. There are currently no adequate and/or efficient solutions addressing the foregoing.

SUMMARY

Accordingly, in one aspect a first device includes a processor and a memory accessible to the processor. The memory bears instructions executable by the processor to receive information pertaining to an event to occur at a first date and a first time, establish an entry at an electronic calendar for the event based on the first date and first time, determine a second date and a second time at which to provide a reminder for the event based at least in part on an event type to which the event pertains, and set the reminder to be provided at the second date and second time.

In another aspect, a method includes receiving first information pertaining to an event to occur at a first date and a first time, using at least a portion of the first information to identify second information for which to associate with a reminder for the event, and at least in part based on the second information, providing the reminder at a second date and a second time before the first date and the first time.

In still another aspect, an apparatus includes a first processor, a network adapter, and storage bearing instructions executable by a second processor for identifying first information pertaining to a first event to occur at a first time. The instructions are also executable for, based at least in part on the first information, identifying second information pertaining to a second time before the first time at which a notification regarding the first event is to be provided, and based at least in part on second information, establishing the notification to be provided at the second time. The first processor transfers the instructions over a network via the network adapter.

The details of present principles, both as to their structure and operation, can best be understood in reference to the accompanying drawings, in which like reference numerals refer to like parts, and in which:

BRIEF DESCRIPTION OF THE DRAWINGS

FIGS. 3-6 are flow charts showing example algorithms in accordance with present principles;

FIGS. 7 and 8 are example data tables in accordance with present principles; and FIGS. 9-12 are example user interfaces (UIs) in accordance with present principles.

DETAILED DESCRIPTION

Figure 1:
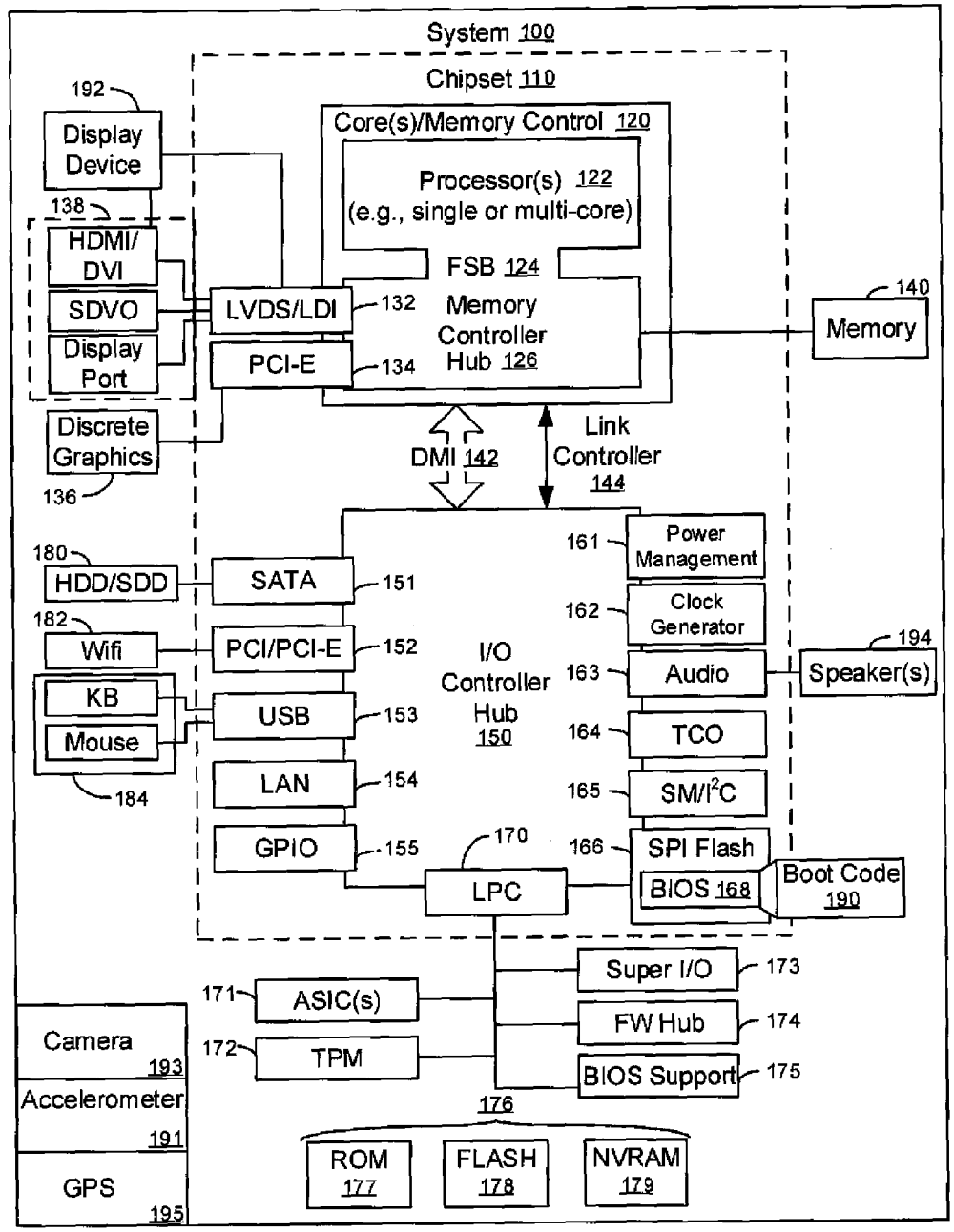
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various subroutines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows that the system 100 includes an accelerometer 191 (and/or another inertial sensor such as e.g. an "all-in-one" sensor comprising at least e.g. an accelerometer and a gyroscope) for e.g. sensing acceleration and/or movement of the system 100 and providing input related thereto to the processor 122. Also included in the system 100 is a camera 193 for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Additionally, the system 100 may include a GPS transceiver 195 that is configured to e.g. receive geographic position information from at least one satellite and provide the information to the processor 122. However, it is to be understood that another suitable position receiver other than a GPS receiver may be used in accordance with present principles to e.g. determine the location of the system 100.

Furthermore, though now shown for clarity, in some embodiments the system 100 may include a gyroscope for e.g. sensing and/or measuring the orientation of the system 100 and providing input related thereto to the processor 122, and an audio receiver/microphone providing input to the processor 122 e.g. based on a user providing audible input to the microphone.

Figure 2:
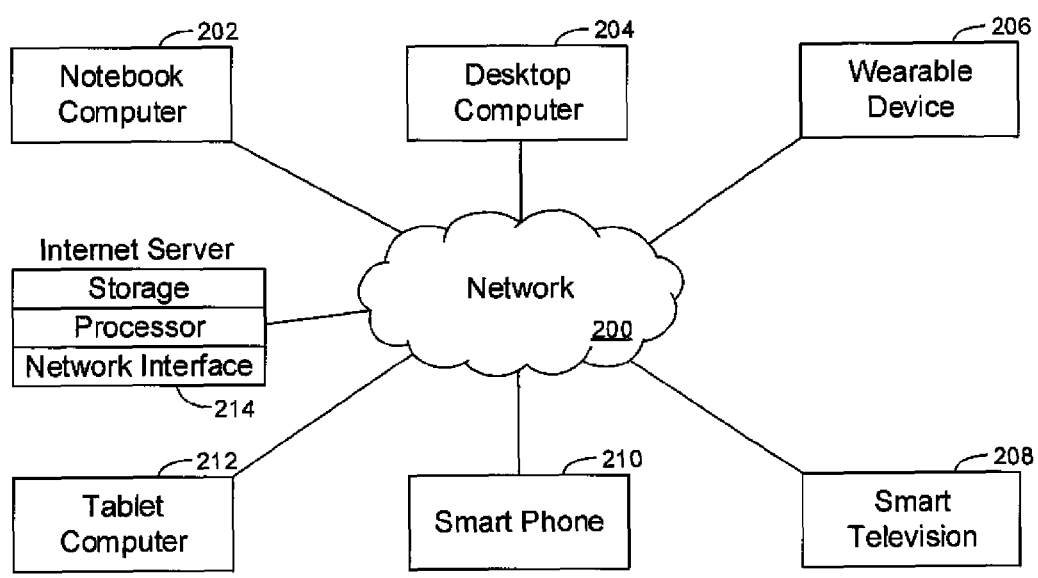
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
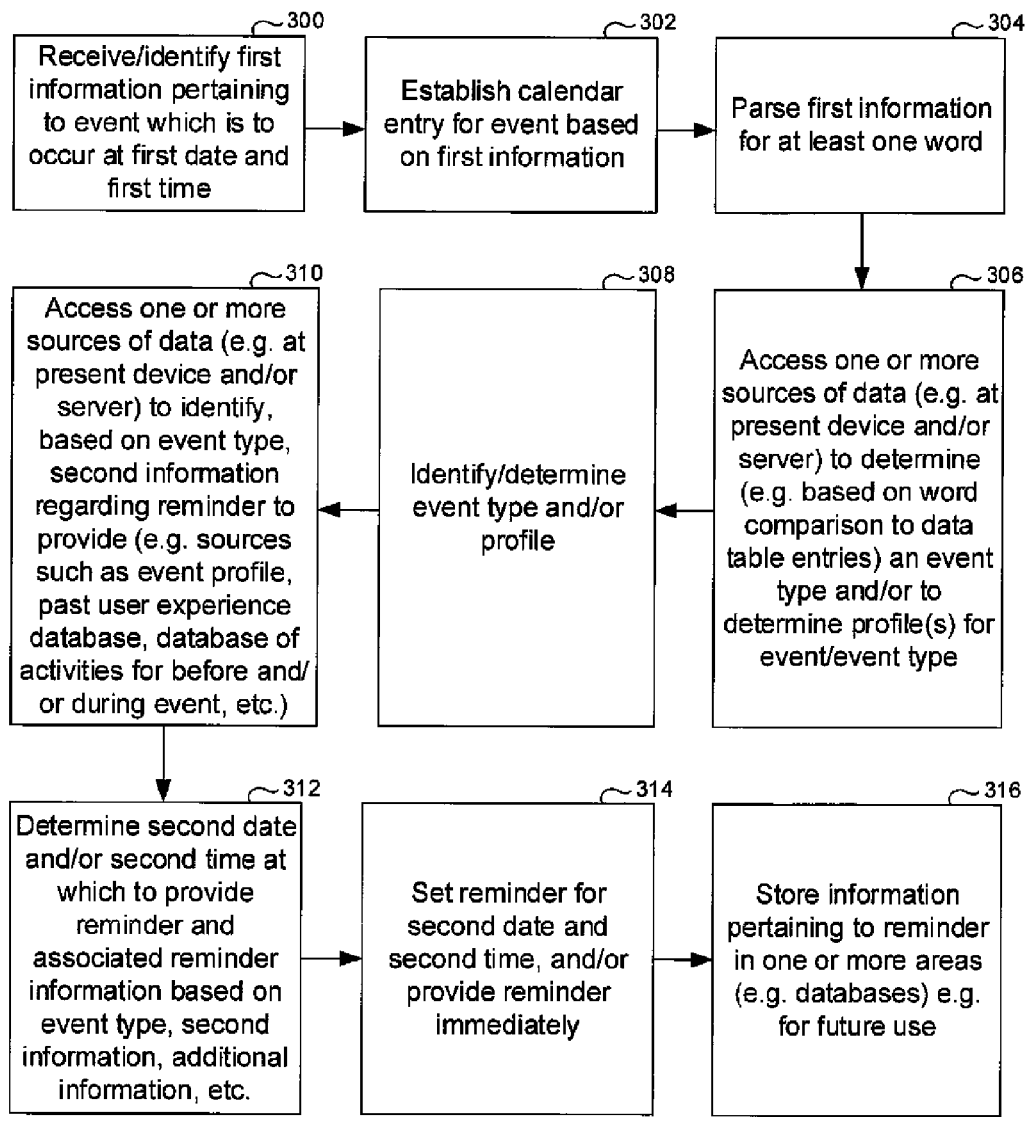

Referring to FIG. 3, it shows example logic that may be undertaken by a device such as the system 100 in accordance with present principles. Beginning at block 300, the logic receives and/or identifies first information (e.g. from a user, from another device, from a notification based on parsing the notification, from information in an email based on parsing the email, etc.) pertaining to an event which is to occur at a first date and a first time. The logic then proceeds to block 302 where the logic (e.g. automatically without user input, responsive to a command from a user, etc.) establishes, in an electronic calendar accessible to the device, a calendar entry for the event based on the first information.

The logic then proceeds to block 304 where the logic parses at least a portion of the first information for at least one word that may be used for purposes to be described shortly. The first information that may be parsed may include e.g. user-provided information, information derived from and/or included in an email, etc. In some embodiments, parsing may include determining which of consecutive characters in the first information establishes a word, where this determination may be based on e.g. comparing one or more consecutive characters to entries in a data table of words to locate a match of the consecutive characters in a sequence to an entry in the data table comprising the consecutive characters in the same sequence.

In any case, after block 304 the logic proceeds to block 306, where the logic accesses one or more sources of data (e.g. stored at the device undertaking the present logic, which is referred to below as the "present device," and/or stored elsewhere such as at a server accessible to the present device) to determine an event type to associate with the event for the calendar entry and/or to determine an event profile to associate with the event for the calendar entry. In some embodiments, the logic may do so at block 306 e.g. by accessing one or more data tables of information (e.g. at a server, and/or at the present device) such as e.g. the table 700 of FIG. 7 to be described below to compare the word identified by parsing the first information at block 304 to an entry in the table that includes the word. Once such an entry is located, the logic at block 308 may gather, access, and/or identify information contained in the data table for the respective entry such as e.g. the event type for the event and/or an event profile for the event. However, also note that in some embodiments, the logic may do so at block 306 by providing the word to a server and receiving from the server such information (e.g. an event type and/or event profile) once the server has determined and/or identified it.

In any case, after block 308 the logic proceeds to block 310, at which the logic accesses one or more sources of data (e.g. stored at the present device and/or stored elsewhere such as at a server accessible to the present device) to identify, e.g. based on the event type determined at block 306, second information regarding a reminder to provide for the event at a time prior to the first date and the first time, such as e.g. activities to be accomplished before the event begins. Sources of information may include but are not limited to e.g. data tables such as the tables of FIGS. 7 and 8 to be described below (e.g. containing event profile information, past user experience information, etc.), information available on the Internet (e.g. a web page), the source of the first information such as e.g. an email that included the first information and also included information pertaining to activities to do to prepare for the event or otherwise determined to pertain in at least some respect to a reminder, etc.

Then, after block 310 the logic moves to block 312 where the logic determines a second date and/or second time at which to provide the reminder and any associated reminder content and/or information that is identified and/or determined. The second date and/or second time may be based on e.g. the event type, dates and/or times indicated in one of the data tables, the second information identified at block 310 such as activities to be accomplished before the event and how long the activities typically take to accomplish to thus determine a reminder date and time before the event at least the amount of time the activities typically take to accomplish, and/or still other information (e.g. provided in the email, accessible over the Internet, etc.), etc. After block 312, the logic moves to block 314 at which the logic sets (e.g. at the calendar) the reminder to be provided at the second date and second time. Also at block 312, if it is determined that e.g. conditions exist for the reminder to be provided currently and/or immediately, the reminder may be provided at block 314.

The logic of FIG. 3 may then conclude at block 316, at which the logic may store information pertaining to the reminder set at block 314 and/or the event itself once it has arrived in one or more areas (e.g. may add or amend information and/or entries in one of the data tables) for future use such as e.g. for determining additional reminders for the event or reminders for another event.

Figure 4:
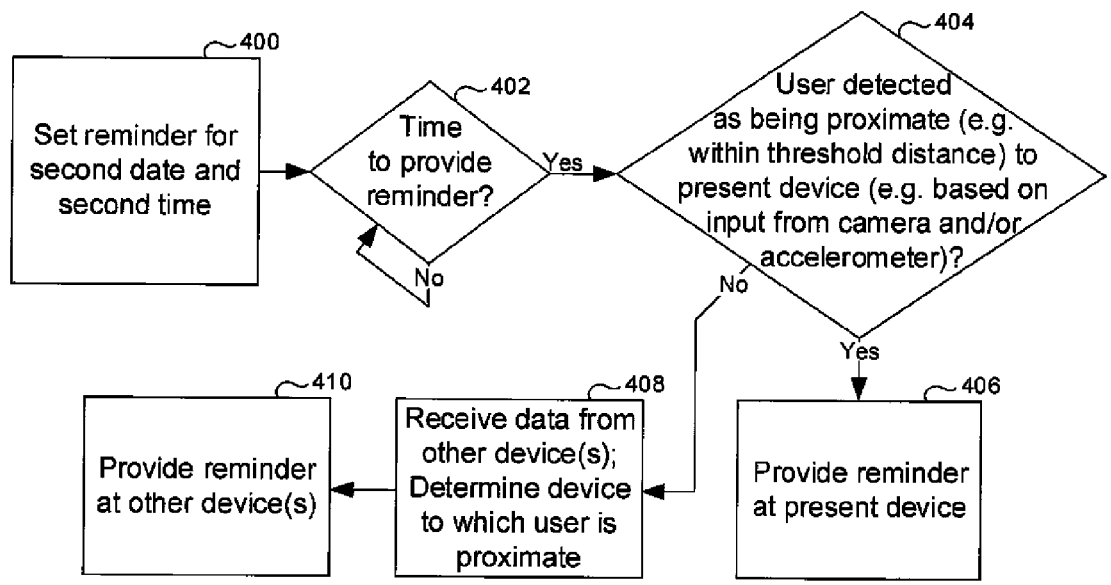

Continuing the detailed description in reference to FIG. 4, it shows example logic that may be undertaken by a device such as the system 100 in accordance with present principles. The logic begins at block 400, where the logic sets a reminder for a second date and second time (e.g. such as described above in reference to block 314). The logic then proceeds to decision diamond 402, at which the logic determines e.g. based on the current date and current time whether to provide the reminder (e.g. whether the current date and current time match the second date and second time, and/or whether the current date and current time are at least within a (e.g. user-defined) threshold time to the second date and second time e.g. so as to not provide reminders at an undesirably early time). A negative determination at diamond 402 causes the logic to continue making the determination thereat until such time as an affirmative determination is made.

Once an affirmative determination is made at diamond 402, the logic proceeds to decision diamond 404 where the logic determines whether a user is detected as being proximate to (e.g. within a (e.g. user-defined) threshold distance of) the device undertaking the logic of FIG. 4 (referred to below as the "present device"). The determination of whether a user is proximate to the device may be based on data from e.g. another device implanted in the user and communicating (e.g. GPS) location information to the present device, based on data from a camera on the present device gathering images of the current field of view of the camera e.g. to thus determine whether the user is in it (e.g. using on facial recognition software) and/or the distance of the user to the present device, based on data from an accelerometer on the present device gathering data pertaining to movement of the present device e.g. to thus determine whether the device is moving and hence the user is in control of and therefore proximate to the present device, etc.

An affirmative determination at diamond 404 causes the logic to move to block 406 where the logic provides the reminder at the present device. However, a negative determination at diamond 404 (e.g. that the user is not within a threshold distance to the present device) instead causes the logic to proceed to block 408. At block 408 the logic may communicate with and/or receive information from one or more other devices and, based on the information received therefrom, determine whether there is another device to which the user is proximate. Information received form one or the other devices may include e.g. network information for other networked devices (e.g. other devices accessible to the present device), (e.g. GPS) location information for the other device and/or location information communicated to the present device from the device implanted in the user, data from a camera on the other device to determine whether the user is proximate thereto as described above, data from an accelerometer on the other device to determine whether the user is proximate thereto as described above, etc. After block 408 the logic proceeds to block 410, where the logic may provide the reminder and/or reminder content on the other device determined to be proximate to the user.

Figure 5:
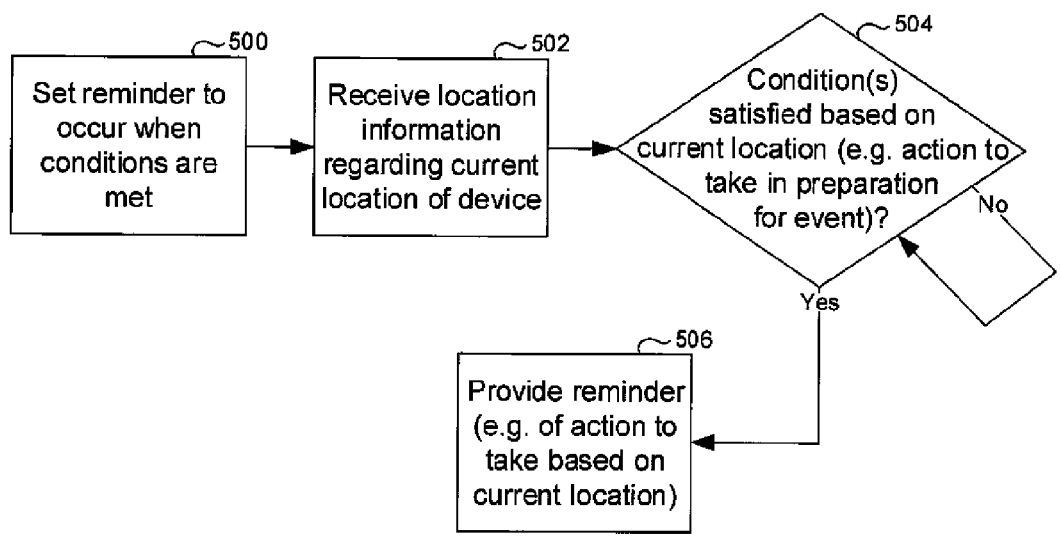

Now in reference to FIG. 5, it shows example logic that may also be undertaken by a device such as the system 100 in accordance with present principles (referred to below as the "present device"). Beginning at block 500, the logic sets a reminder to be provided (e.g. in addition to or in lieu of a particular date and time) when one or more conditions for providing the reminder are met (and optionally when the current date and time are within a threshold time to the date and time at which the reminder is to be provided e.g. so as to not receive a reminder at too early a time and/or when other activities should take priority given how far away the reminder time and/or event itself is). Such conditions may e.g. correspond to activities to be accomplished prior to the event e.g. at particular locations and/or location types. E.g. an activity may be buying a birthday card for a birthday party event, and thus the condition may be e.g. the device determining that it has been taken to within a threshold distance of a birthday card purchasing location at which a birthday card may be purchased.

In any case, once the reminder is set at block 500, the logic proceeds to block 502 where the logic receives location information regarding the current location of the present device (e.g. from a GPS transceiver on the present device, from a source or provider of location services, etc.). The logic then proceeds to block 504 where the logic determines whether one or more of the conditions are met and/or satisfied based on e.g. the current location, such as being proximate to a location at which an action in preparation of the event is to occur (e.g. also using e.g. location services (and/or GPS specifically) which may indicate a location pertaining to the action), such as buying a birthday card from a birthday card purchasing location. A negative determination at diamond 504 causes the logic to continue making the determination thereat until an affirmative determination is made. Once an affirmative determination is made, the logic proceeds to block 506 where the logic provides the reminder at the present device that contains content e.g. indicating that the condition is met and/or indicating the activity to accomplish at a specific location.

Continuing the detailed description in reference to FIG. 6, it shows example logic that may be undertaken by a device such as the system 100 in accordance with present principles (referred to below as the "present device"). The logic begins at block 600 where the logic sets a reminder to be provided at a second date and a second time before a first date and first time of an event (e.g. such as at block 314 described above). The logic then proceeds to decision diamond 602 where the logic determines whether the second date and second time are at a date and time that the user is typically away from the present device. Such a determination may be based on e.g. a history of user proximity information gathered over time by the present device and/or that is accessed by the present device to make the determination. The history may contain information e.g. gathered by an accelerometer on the present device, a camera on the present device, and/or from an implantable device in the user communicating location information to the present device, where the information is associated with e.g. particular dates and times (e.g. particular days of the week, month, year, etc., as well as time frames in a particular day, etc.) indicative of whether the user was proximate to the present device as described herein at that particular e.g. time and/or day of the week.

Thus, should it be determined that the second date and second time are on a day of the week at a particular time when the user is typically not proximate to the present device, the logic may proceed to block 606, which will be described shortly. However, first note that a negative determination at diamond 602 (e.g. that the user is not typically away from the present device on a day of the week and time of day corresponding to the second date and second time), the logic instead moves to block 604 where the logic determines that the reminder is to be provided on the present device at the second date and second time.

Now describing the afore-mentioned block 606, at block 606 the logic may determine and/or identify a third date and a third time (e.g. on the same day of the week as the second date but at a different time) that is e.g. different from the second date and/or second time (e.g. but still before the date and time of the event itself) and that is when the user is typically still proximate to the present device before moving away from it as indicated in the history and/or determined from the history. Also at block 606 in addition to or in lieu of determining the third date and third time, the logic may determine (e.g. based on the history) another device the user is typically proximate to at a day of the week and time of day corresponding to the second date and second time and set the reminder to be provided on the other device at the second date and second time, and/or may determine a condition which if exists would be an appropriate time to provide the reminder even if not at the second date and second time and accordingly sets the reminder to be provided upon satisfaction of the condition. In some embodiments, typically proximate may mean e.g. proximate a (e.g. user-defined) threshold number of times within (e.g. user-defined) threshold period of time, and/or may mean an average of more often than not being proximate in previous instances during the same day of the week as the second date and the same time at the second time. Regardless, but also at block 606, it is to be understood that should the third date and third time be determined and/or identified, the logic sets the reminder to be provided on the present device at the third date and third time.

Before describing FIG. 7, it is to be understood that the logic of the respective flow charts described above in reference to FIGS. 3-6 may be undertaken separately by a device in accordance with present principles, and/or at least portions thereof may be combined with and/or used in conjunction with each other.

Reference is now made to FIG. 7, which shows an example data table 700 in accordance with present principles. The table 700 thus includes rows of respective entries for respective words and/or event types that include associated information in respective columns for each entry. A first column 702 pertains to a word (e.g. a keyword) for and/or associated with a respective entry, which may be matched to a word determined based on a parsing of information related to a calendar entry (e.g. as done at block 304 of FIG. 3 described above). The table 700 also includes a column 704 pertaining to an event type for and/or associated with a respective entry, as well as a column 706 pertaining to past user experience information for and/or associated with a respective entry (e.g. associated with a respective event type), a column 708 pertaining to past event information for and/or associated with a respective entry (e.g. associated with a respective event type), a column 710 pertaining to activities to be done before an event of a respective event type to which a respective entry pertains, and a column 721 pertaining to activities to be done at and/or during an event of a respective event type to which a respective entry pertains.

Thus, as examples and still in reference to FIG. 7, note that a first entry 714 is associated with the word "birthday," which may be used by the device to match a word (e.g. "birth" or "birthday") derived from information that is parsed to thus determine and/or identify the event type birthday party at column 704 for entry 714. Past user experience for events of the event type birthday party include that a card was purchased, that another item (e.g. a birthday present) was purchased, and that the user with which the table 700 is associated ate cake at the event (e.g. as determined based on signals from a digital camera on the device that gathered images of the user eating cake at the event, which then may be analyzed by the device to determine that the user was eating cake and to thus enter such information in column 706 for entry 714). Past event information for events of the event type birthday party include that there was a $50 cap on presents for a previous event of the event type (e.g. as determined based on information received by the device (e.g. in an email) such as e.g. at block 300 of the logic described above), and that $55 was spent at Amazon.com five days prior to a previous event of the event type (e.g. as determined based on a receipt from Amazon.com for the purchase received in an email to an email account to which the device has access, and/or based on browser tracking software for a browser of the device used to make the purchase on Amazon.com). Activities to be done before an event of the birthday party event type include purchasing a birthday present, while activities to be done at an event of the birthday party event type include eating and talking in a group. Note that both the activities in column 710 and column 712 for any given entry may be determined e.g. based on user input specifying the one or more activities, as will be described further below.

As another example, a second entry 716 is associated with the word "boss," which may be used by the device to match a word derived from information that is parsed to thus determine the event type work meeting at column 704 for entry 716. Past user experience for events of the event type work meeting include eating at a previous meeting, that the user's heart rate increased during a pervious work meeting (e.g. as determined based on data from one or more biometric sensors in communication with the device), and that the user prepared for two hours for a past event of the event type work meeting. Past event information for events of the event type work meeting include that the location of a past event of the event type work meeting was 2.2 miles away from the user's office location. Activities to be done before an event of the work meeting event type include preparing a meeting outline, while activities to be done at an event of the work meeting event type include eating and discussing items on an agenda.

As but one more example, a third entry 718 is associated with the words "Dr. James," which may be used by the device to match a word derived from information that is parsed to thus determine the event type medical appointment at column 704 for entry 718. Past user experience for events of the event type medical appointment include fasting for twelve hours prior to a previous medical appointment event, that the user (e.g. based on GPS location information gathered by the device which accompanied the user) was ten minutes late to a previous event of the medical appointment event type, and that the user's body temperature increased during a previous medical appointment (e.g. as determined based on data from one or more biometric sensors in communication with the device). Past event information for events of the event type medical appointment include that electronic forms were completed (e.g. on the device, as determined by the device). Activities to be done before an event of the medical appointment event type include getting blood-work done and fasting for twelve hours, while activities to be done at an event of the medical appointment event type include participating in an office visit with a physician and providing vitals.

Moving on, reference is now made to FIG. 8, which shows an example data table 800 in accordance with present principles. The table 800 thus includes rows of respective entries for respective event profiles to be used in accordance with present principles and that include associated information for each entry in respective columns. As may be appreciated from the data table 800 of FIG. 8, a column 802 pertains to names for respective profiles, a column 804 pertains to a first default time at which a first reminder of an event associated with the profile is to be provided, a column 806 pertains to content which is to be provided in and/or with the first reminder at the first default time (e.g. as indicated in an information box presented on a display of the device that at least in part establishes the reminder), a column 808 pertains to a second default time at which a second reminder for the event is to be provided, and a column 810 pertains to content which is to be provided in and/or with the second reminder at the second default time.

Describing one example entry in the table 800, an entry for the profile birthday party indicates that a first reminder is to be provided two days before the event, while first reminder content includes an instruction to buy a present. A second reminder is to be provided two hours before an event associated with the birthday party profile, but note that the data table 800 indicates that the reminder is to be provided on another device called "Device 2." Last, second reminder content includes an instruction to not eat until the birthday party.

Continuing the detailed description in reference to FIG. 9, it shows an example user interface (UI) 900 that may be presented on a device for creating an event to be entered into a calendar in accordance with present principles. The UI 900 thus includes a first input field 902 manipulable by a user to enter thereat a title and/or information for an event to be created, a second input field 904 manipulable by a user to enter thereat a date for the event, and a third input field 906 manipulable by a user to enter thereat a time on the date for the event. The UI 900 also includes a fourth input field 908 manipulable by a user to enter thereat reminder information and/or content to be provided in a reminder of the event, while input field 910 is manipulable by a user to enter thereat a date for the reminder and input field 912 is manipulable by a user to enter thereat a time for the reminder to be provided on the date.

Still in reference to the UI 900, also note that it includes an area 914 pertaining to an event profile (and/or event type in some embodiments) for which to associate with the event being created using the UI 900 e.g. for a device undertaking present principles to determine certain information regarding one or more reminders for the event once associated with a profile and/or event type (e.g. based on data in a data table such as one of the tables 700 and 800 described above). Thus, the UI 900 includes one or more selector elements for one or more profiles and/or event types (e.g. depending on the embodiment) that are selectable to automatically without further user input responsive thereto associate the event being created with the profile and/or event type associated with the respective selector element that is selected. Thus, a first selector element 916 is associated with a birthday party profile and/or event type, a second selector element 918 is associated with a medial appointment profile and/or event type, and a third selector element 920 is associated with a work meeting profile and/or event type. Last, note that a submit selector element 922 is shown which is selectable to automatically without further user input create a calendar entry for an event according to the information provided to the UI 900 (e.g. even if not all fields have had information entered thereto by the user).

Now in reference to FIG. 10, it shows an example UI 1000 for creating an event profile for which to associate with an event entered into or to be entered into a calendar in accordance with present principles, it being understood that the UI 1000 includes example entries regarding a birthday party profile being created. The UI 1000 thus includes a first input field 1002 manipulable by a user to enter thereat a title for a profile to be created, which in this case is "birthday party." The UI 1000 also includes a second input field 1004 manipulable by a user to enter thereat a default reminder time for providing a first reminder for an event with which the profile is associated, which in this case is two days prior to the event. Also note that selector elements 1006 and 1008 are shown which are respectively selectable to automatically without further user input responsive thereto configure the first reminder to either or both of be provided on the device on which the UI 1000 is presented (referred to below as the "present device") and/or a second device in communication with the present device. The UI 1000 also includes a third input field 1010 manipulable by a user to enter thereat e.g. user-defined content to be provided in and/or with the first reminder, which in this case is an instruction to "buy present."

The UI 1000 also includes input fields for a second reminder so that one can be provided if desired (e.g., if no information is entered into the UI 1000 for the fields pertaining to the second reminder, then the device will not provide a second reminder and/or will leave corresponding boxes in a data table such as the table 800 blank). An input field 1012 is also shown which is manipulable by a user to enter thereat a default reminder time for providing a second reminder for the event, which in this case is two hours prior to the event. Further, note that selector elements 1014 and 1016 are shown which are respectively selectable to automatically without further user input responsive thereto configure the second reminder to either or both of be provided on the present device and/or the second device. The UI 1000 also includes an input field 1018 manipulable by a user to enter thereat e.g. user-defined content to be provided in and/or with the second reminder, which in this case is an instruction to "not eat until party." Last, note that a submit selector element 1020 is shown which is selectable to automatically without further user input create an event profile according to the information provided to the UI 1000 (e.g. even if not all fields have had information entered thereto by the user).

Thus, it may be appreciated that by creating an event for entry into an electronic calendar using the UI 900 of FIG. 9 and selecting a profile and/or event type therefrom to be associated with the event, respective reminders at default reminder times per the respective profile and/or event type and including user-defined content may be provided automatically without the user each and every time an event is being created which is to be associated with the profile and/or event type having to specify as much. Instead, e.g. simply by selecting one of the elements 916-920, default user-generated content e.g. entered into fields 1010 and 1018 may be automatically provided at respective default reminder times.

FIG. 11 shows an example UI 1100 that may be presented automatically responsive to an event being created in a calendar, such as may be presented e.g. responsive to selection of the selector element 922 described above. The UI 1100 includes an indication 1102 that an event has been created in the calendar, as well as a prompt 1104 for whether the user would like to create an event profile to be associated with the event and/or other events of the same event type in accordance with present principles. Thus, a selector element 1106 is shown on the UI 1100, which is selectable to automatically without further user input responsive thereto cause a profile configuration UI to be presented, such as the UI 1000 described above.

The UI 1100 of FIG. 11 also includes a prompt 1108 for whether to create specific reminders for events of the event type with which the event is associated, even if e.g. not associated with a particular profile. Accordingly, present principles recognize that one or more sources (e.g. data tables) of information for event types (e.g. for which all events corresponding to the particular event type may be associated) may be created and/or configured using a UI with input fields similar to those described above and/or corresponding to data types indicated in columns of a data table such as the tables 700 and 800 to thus establish information, items, and/or parameters that are to be associated with events of the event type such as e.g. default reminder dates, times, content, activities to be completed before the event of the event type, activities which are to be completed during the event of the event type, etc. Thus, note that once a user configures an event type using such a UI, the information may be entered into and/or added to a table such as e.g. the table 700. Thus, and referring again to the prompt 1108 for creating one or more specific reminders, note that a selector element 1110 is associated therewith and is selectable to automatically without further user input present such an event type UI for configuring one or more of these defaults.

Figure 12:
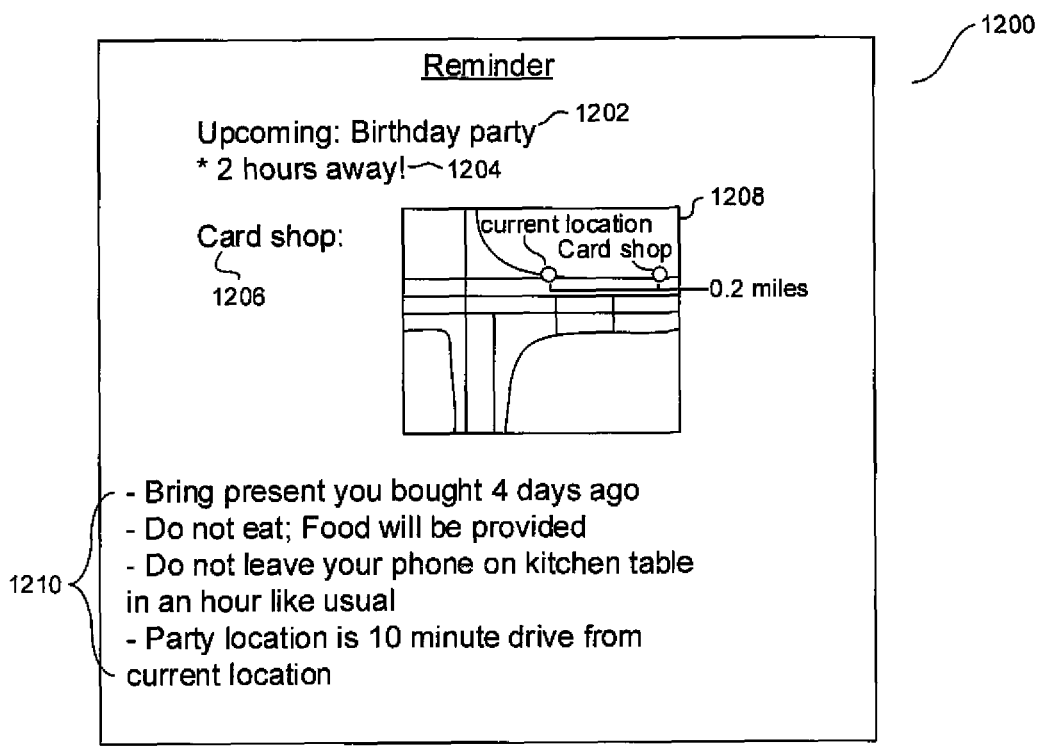

Now in reference to FIG. 12, it shows an example reminder UI 1200 that may be presented on a display of a device undertaking present principles. The UI 1200 includes an indication 1202 that a particular birthday party event it is upcoming, along with a temporal indication 1204 of when the event is to occur (in the present example, in two hours). The UI 1200 also includes a portion 1206 pertaining to information on where to participate in activities in preparation for the event, which in the present example instance, involving an upcoming birthday party, includes buying a card. A map 1208 is thus shown which may include an indication of and/or directions to a card shop relative to a current location of the device (e.g. based on GPS data from a GPS transceiver on the device).

Still further, the UI 1200 may also include one or more pieces of (e.g. default and/or specific) reminder content 1210 which has been associated with the event either e.g. based on defaults established as described above and/or based on user input regarding a reminder for the particular event, such as e.g. instructions to bring a present purchased four days ago (e.g. as determined by the device), to not eat before the event because food will be provided, and/or to not leave the device presenting the UI 1200 on the user's kitchen table in an hour as the user typically does at that time of the week (e.g. as determined based on a history of user proximity information such as the one described above). The reminder content 1210 may also include indications such as e.g. that the location for the event is a certain distance and/or travel time away from the user's current location (e.g. as determined based on GPS data from a GPS transceiver on the device). Note that still other information may be provided in the content 1210, such as e.g. any such information for a birthday party event type and/or profile stored in a data table such as the tables 700 and 800 described above.

Without reference to any particular figure, it is to be understood that still other information may be included in respective columns of data tables for use in accordance with present principles, such as the data tables 700 and 800 described above. E.g., there may be areas for information pertaining to a method of providing a reminder, such as whether the reminder should be presented on a display of the device (and furthermore whether it should be presented e.g. as a pop-up reminder, in an email to an email account to which the device has access, etc.) and/or audibly presented using a speaker on the device. There may also be an area in such a data table for e.g. which device(s) of a plurality of devices a reminder should be provided on.

Furthermore, note that reminders in accordance with present principles may combine information from plural data tables (e.g. the tables 700 and 800) in single reminder. Even further, information for such data tables and/or to otherwise use in accordance with present principles may be gathered by more than one device and stored at a location accessible to any given device that is undertaking present principles and linked to the other devices.

Also note that an event type may be determined using a first data table to match a word from event information to a word in the first data table (e.g. the table 700), and then associated profile information e.g. for an event of the identified event type may be accessed at a second data table different from the first one (e.g. the table 800) based on the information in the first data table. Accordingly, it is to be understood that a table such as the table 800 may also include a respective column for event type in addition to the columns described above.

Further still, it is to be understood that a profile as described herein may, in addition to or in lieu of being established based on user input, be established and/or edited automatically by a device undertaking present principles as it "learns" based on events and reminders provided thereat.

Also note that in addition to e.g. using a keyboard or other input device to provide input to one of the input fields described herein and/or to provide still other user input as described herein, such input may also be provided audibly by a user and processed using e.g. a personal assistant application and/or an audible input application. Thus, e.g., when creating an event, a user may audibly specify that a reminder include certain information and be provided at a certain time. What's more, the event itself may be created based on audible input.

Moreover, note that in addition to customized and/or context-specific reminders such as those discussed herein, default reminders may still be provided in some embodiments such as e.g. a generic event reminder which is provided an hour before an event regardless of event type or other event information.

It may now be appreciated that present principles provide for a device undertaking present principles to determine "ideal" reminder times based on calendar entry data and past history. The device may then automatically set the reminder time(s) for the user.

This may be done in some embodiments by parsing the event text or otherwise identifying information therein. For example, if the event text references a birthday party, the device could first create a reminder three days in advance to purchase a present, or however the user has configured the first auto-reminder. A second reminder could be a "standard" reminder for all events in a calendar such as occurring per a default setting e.g. one hour beforehand.

Further, based on context determined by the device (e.g. by parsing the event text), a "floating" reminder that does not necessarily have a time at which it is to be provided associated with it but instead a condition that is to be satisfied for it to be provided could link a location to a reminder. For example, if the user is near a card shop and proximity to a card shop satisfies a condition for providing the reminder, the device may present a reminder to buy a card for the occasion when within the proximity. In this respect, present principles are understood to include correlating context to a location.

Further still, associating an event to a meal may be done by the device by accessing data pertaining to an event location and determining if it is a restaurant location, or if the event text mentions lunch, dinner, hors d'oeuvres, etc. If a meal can be associated with the event, the device may store associated reminder information and then warn the user if it detects the user is about to eat at a time prior to the event (e.g. within a user-defined threshold time of the event) by e.g. using the GPS transceiver on the device to detect a current location correlated to another restaurant and/or using a camera to detect the user is about to eat food (e.g. detecting an item in a person's hand being transitioned to their mouth and/or recognizing the item as food). Such a reminder would inform the user that food is being provided at the upcoming event and therefore that the user should stop eating.

Briefly returning to the medical appointment example, the device may detect if the user needs to fast the night/morning before the appointment (e.g. based on information from a health website parsed by the device and accessed over the Internet, based on previous context (e.g. previous medical appointment data to which the device has access), and/or based on information provided by a user) and alert the user about the fasting. If the user attempts to eat something, the device may identify as much and remind them not to do so. The device may also remind them to fill out forms for the doctor in advance of the appointment and/or allow extra time before the appointment to fill out forms.

Additionally, it is to be understood that if the user schedules a calendar entry for a time when the user typically does not have their device nearby, the device may increase the notification lead time by a certain amount and/or notify the user at a time before they typically separate from their device so that the user does not forget about the appointment while away from the device. Determining whether a user has separated from their device may be done e.g. using data from accelerometer and/or camera as described herein.

Moreover, if the user schedules a meeting at a time that is not typical for them to schedule a meeting and/or when the user is typically away from their device, a reminder time could be used that is provided relatively further in advance. For example, if the user schedules an event for a Sunday afternoon when they typically get involved in a project at home and do not have their device nearby, the reminder time could be increased so the user doesn't start a project they won't finish because of the event. In this respect, it is to be understood that present principles provide for advancing reminder times based on context.

As another example, if the user has an early appointment the next morning, a notification could be given at a time the night before (e.g. based on a user's sleep cycle for past sleep instances stored in a data structure indicating that the user is typically asleep when the notification would otherwise be provided) in case any special preparation is needed (e.g. user needs to print something out for the next day, go to bed earlier than normal, etc.).

Furthermore, as also set forth above, a device in accordance with present principles may prompt the user to input a reminder profile to be associated with future related events. Also, reminders could be customized for certain times of day, days of the week, time of year, etc. They could also be customized for event types (e.g. birthday parties, dinner parties, flights, etc.). Each of these could be configured so that in the future, similar calendar entries could have multiple auto-reminders or different reminder default times without having to establish and/or customize each event and/or reminder individually each time an event is created. Note that in instances where device confidence is not high enough to automatically set a reminder time e.g. based on data that is available or even based on no data being available for such purposes, the device may prompt the user for such information before creating an auto-reminder until it can learn the user's preferences and e.g. store them in data tables for future use.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular ESTABLISHING A REMINDER FOR AN EVENT IN A CALENDAR is herein shown and described in detail, it is to be understood that the subject matter which is encompassed by the present application is limited only by the claims.

What is claimed is:

1. A first device, comprising:
   a processor; and
   a memory accessible to the processor and bearing instructions executable by the processor to:
   receive information pertaining to an event to occur at a first date and a first time;
   establish an entry at an electronic calendar for the event based on the first date and first time;
   determine a second date and a second time at which to provide a reminder for the event based at least in part on an event type to which the event pertains;
   determine whether at least the second time is at a time that a user is typically away from the first device;
   responsive to a determination that at least the second time is not at a time that a user is typically away from the first device, set the reminder to be provided at the second time;
   responsive to a determination that at least the second time is at a time that a user is typically away from the first device, identify at least a third time that is different form the second time and that is a time when the user is typically proximate to the first device; and
   set the reminder to be provided at the third time.

2. The first device of claim 1, wherein the instructions are further executable to:
   access a data structure comprising data pertaining to past experience of a user;
   determine the second date and second time at least in part on the event type and the data.

3. The first device of claim 1, wherein the instructions are further executable to:
   access a data structure comprising data pertaining to past event information;
   determine the second date and second time at least in part on the event type and the data.

4. The first device of claim 1, wherein the instructions are further executable to:
   access a data structure comprising data pertaining to at least one activity associated with the event type;
   determine the second date and second time at least in part on the event type and the data.

5. The first device of claim 4, wherein the data pertains to at least one activity to occur before an event of the event type.

6. The first device of claim 5, wherein at least one activity to occur before the event type at least comprises preparation for an event of the event type, wherein the data structure contains data pertaining to an amount of preparation time for an event of the event type, and wherein the second date and second time is a moment that is at least the amount of preparation time before the first date and first time.

7. The first device of claim 4, wherein the data pertains to at least one activity to occur during an event of the event type.

8. The first device of claim 1, wherein the instructions are executable by the processor to:
   determine the event type at the first device.

9. The first device of claim 1, wherein the information is first information, and wherein the instructions are executable by the processor to:
   determine the event type at least in part based on communication with a server to receive from the server second information pertaining to the event type, the communication with the server comprising providing at least a portion of the first information received at the device to the server.

10. The first device of claim 1, wherein the instructions are further executable by the processor to:
   parse at least a portion of the information to identify at least one word for use to determine the event type.

11. The first device of claim 10, wherein the instructions are further executable by the processor to:
   compare the at least one word to at least one entry in a data table of words and respectively associated event types; and
   determine the event type at least in part based on a match of the at least one word to at least one entry in the data table.

12. The first device of claim 1, wherein the instructions are further executable by the processor to:
   at least within a threshold time of the second date and second time, determine that a user with which the event is associated is not at least within a threshold distance of the first device; and
   provide the reminder on a second device different from the first device in response to the determination that the user is not at least within the threshold distance.

13. The first device of claim 12, comprising an accelerometer and a camera, wherein the determination that the user is not at least within the threshold distance is based at least on part on data from at least one of the group consisting of: the accelerometer, the camera.

14. The first device of claim 1, wherein the first date and the second date are the same date.

15. The first device of claim 1, wherein the instructions are executable to:
   access a database of event profiles;
   identify an event profile to which the event pertains; and
   determine the event type based on the identified event profile.

16. A method, comprising:
   receiving first information pertaining to an event to occur at a first date and a first time;
   using at least a portion of the first information to identify second information for which to associate with a reminder for the event;
   determining a second time to present the reminder for the event;
   determining whether at least the second time is at a time that a user is typically away from the first device;
   responsive to a determination that at least the second time is not at a time that a user is typically away from the first device, providing the reminder at a second date and the second time, the second time being before the first date and the first time;
   responsive to a determination that at least the second time is at a time that a user is typically away from the first device, identifying at least a third time that is different from the second time and that is a time when the user is typically proximate to the first device; and
   setting the reminder to be provided at the third time.

17. The method of claim 16, comprising:
   parsing at least a portion of the first information to identify at least one word from the first information, and using the at least one word to identify the second information.

18. The method of claim 16, comprising:
   based at least in part on the first information, accessing at least one event profile; and
   using the event profile to identify the second information.

19. The method of claim 16, further comprising:
   comparing at least one word from the first information to at least one entry in a data structure of words and corresponding event types associated with respective words in the data structure; and
   identifying, for the event, an event type at least in part by matching the at least one word to at least one entry in the data structure.

20. The method of claim 19, further comprising:
   in response to identifying of the event type, using the event type at least in part to identify the second information.

21. The method of claim 16, further comprising:
   identifying location information pertaining to a current location of a device; and
   determining whether the location information at least in part satisfies a condition from the second information for which the reminder is to be provided upon satisfaction of the condition.

22. The method of claim 21, wherein the second date is a current date, and wherein the second time is a current time.

23. The method of claim 22, wherein the second information pertains to an action for a person to take at least within a threshold distance of the current location.

24. An apparatus comprising:
   a first processor;
   a network adapter;
   storage bearing instructions executable by a second processor for:
      identifying first information pertaining to a first event to occur at a first time;
      based at least in part on the first information, identifying second information pertaining to a second time before the first time at which a notification regarding the first event is to be provided;
      based at least in part on second information, establishing the notification to be provided at the second time;
      determining whether at least the second time is at a time that a user is typically away from the apparatus;
      responsive to a determination that at least the second time is not at a time that a user is typically away from the apparatus, setting the reminder to be provided at the second time;
      responsive to a determination that at least the second time is at a time that a user is typically away from the apparatus, identifying at least a third time that is different from the second time and that is a time when the user is typically proximate to the apparatus; and
   setting the reminder to be provided at the third time;
   wherein the first processor transfers the instructions over a network via the network adapter.

* * * * *